US012613165B2

(12) United States Patent
Jiang et al.

(10) Patent No.: US 12,613,165 B2
(45) Date of Patent: Apr. 28, 2026

(54) AUTOMATIC SAMPLING DEVICE AND METHOD FOR DETERMINING GREENHOUSE GAS EMISSION FLUX FROM FARMLAND

(71) Applicant: Zhejiang University, Hangzhou (CN)

(72) Inventors: Qianjing Jiang, Hangzhou (CN); Jin Wang, Hangzhou (CN); Yong He, Hangzhou (CN)

(73) Assignee: Zhejiang University, Hangzhou (CN)

( * ) Notice: Subject to any disclaimer, the term of this patent is extended or adjusted under 35 U.S.C. 154(b) by 277 days.

(21) Appl. No.: 18/496,852

(22) Filed: Oct. 28, 2023

(65) Prior Publication Data

US 2024/0192096 A1     Jun. 13, 2024

(30) Foreign Application Priority Data

Dec. 12, 2022     (CN) .......................... 202211606289.2

(51) Int. Cl.
G01N 1/22          (2006.01)
G01N 1/00          (2006.01)
G01N 1/24          (2006.01)

(52) U.S. Cl.
CPC ......... G01N 1/2294 (2013.01); G01N 1/2273 (2013.01); G01N 1/24 (2013.01); *G01N 2001/002* (2013.01); *G01N 2001/2297* (2013.01); *G01N 2001/248* (2013.01)

(58) Field of Classification Search
CPC .............. G01N 1/2294; G01N 1/2273; G01N 2001/2297; G01N 1/24; G01N 2001/248; G01N 2001/002
See application file for complete search history.

(56) References Cited

FOREIGN PATENT DOCUMENTS

CN          210513831 U   *   5/2020
CN          114323824 A   *   4/2022

* cited by examiner

*Primary Examiner* — Paul M. West
(74) *Attorney, Agent, or Firm* — Harness, Dickey & Pierce, P.L.C.

(57)          ABSTRACT

An automatic sampling device and method for determining greenhouse gas emission flux from farmland are provided. The device includes a static chamber, a flow meter, and a collection box. The static chamber communicates with a gas inlet of the collection box. The flow meter is arranged in a gas pipe between the static chamber and the collection box. The static chamber is used to cover plants to be tested and to keep the plants to be tested in a closed environment. The flow meter is used to determine a gas flow rate in the gas pipe between the static chamber and the collection box in real time. The collection box is internally provided a plurality of collection loops and a controller. Each collection loop is used to collect a gas in the static chamber at different time according to collection settings of the controller.

9 Claims, 2 Drawing Sheets

AUTOMATIC SAMPLING DEVICE AND METHOD FOR DETERMINING GREENHOUSE GAS EMISSION FLUX FROM FARMLAND

CROSS-REFERENCE TO RELATED APPLICATION

This patent application claims the benefit and priority of Chinese Patent Application No. 202211606289.2, filed with the China National Intellectual Property Administration on Dec. 12, 2022, the disclosure of which is incorporated by reference herein in its entirety as part of the present application.

TECHNICAL FIELD

The present disclosure relates to the field of determining a greenhouse gas emission flux from farmland, and in particular to an automatic sampling device and method for determining greenhouse gas emission flux from farmland.

BACKGROUND

Global climate change poses a serious threat to the survival and development of humankind and has attracted the widespread attention of governments and international academic circles. The increase of greenhouse gases is one of the major causes of global climate change. According to the statistics of FAO (Food and Agriculture Organization of United Nations (FAO), the greenhouse gases released from agricultural land exceed 30% of the total anthropogenic greenhouse gas emissions in the world. Farmland ecosystems are the most active part of human activities and play an important role in the study of global change, and thus accurate and rapid monitoring of greenhouse gas emissions from the farmland has an important impact on farmland ecosystems. However, in the prior art, the determination of greenhouse gas emission flux from farmland is generally manual gas collection, while the manual gas collection will waste a lot of manpower and time costs, and is difficult to operate manually at night or at high frequency.

SUMMARY

An objective of the present disclosure is to provide an automatic sampling device and method for determining greenhouse gas emission flux from farmland, which can achieve accurate timing sampling of greenhouse gases from the farmland and automatic control of the whole process.

In order to achieve the above objective, the present disclosure provides the following solution: an automatic sampling device for determining greenhouse gas emission flux from farmland includes a static chamber and a collection box.

The static chamber communicates with a gas inlet of the collection box. The flow meter is arranged in a gas pipe between the static chamber and the collection box.

The static chamber is used to cover plants to be tested and to keep the plants to be tested in a closed environment.

The flow meter is used to determine a gas flow rate in the gas pipe between the static chamber and the collection box in real time.

The collection box is internally provided with multiple collection loops and a controller. Each collection loop is used to collect a gas in the static chamber at different time according to collection settings of the controller. The collection settings include: gas collection start time, gas collection time interval, and the number of collections.

Alternatively, the collection loop includes a gas inlet pipeline, a collection gas bag, and a gas outlet pipeline.

The gas inlet pipeline is used to open a gas path according to a control of the controller for gas collection, and to close the gas path according to a control of the controller after the gas collection is completed.

The collection gas bag is used for gas collection and is closed after the gas collection is completed.

The gas outlet pipeline is used to open the gas path for gas exhausting according to a control of the controller after the collection of the collection gas bag is completed, and to close the gas path according to a control of the controller after the gas exhausting is completed.

Alternatively, each of the gas inlet pipeline and the gas outlet pipe is provided with a solenoid valve.

Alternatively, the collection box further includes a gas intake pump and a gas extraction pump.

A gas inlet of the gas intake pump communicates with the gas inlet of the collection box, and a gas outlet of the gas intake pump communicates with a gas inlet of a gas inlet path.

The gas intake pump is used to collect the gas in the static chamber into a corresponding collection loop.

A gas inlet of the gas extraction pump communicates with a gas outlet of the gas outlet pipeline, and a gas outlet of the gas extraction pump communicates with a gas outlet of the collection box.

The gas extraction pump is used to exhaust gases from the gas inlet pipeline and the gas outlet pipeline in the collection loop.

Alternatively, a model of the controller is STM32F103.

Alternatively, the collection box further includes a display screen, and an operation panel.

The display screen is connected to the operation panel, and the operation panel is connected to the controller.

An automatic sampling method for determining greenhouse gas emission flux from farmland is used to achieve the automatic sampling device. The automatic sampling method includes the following steps covering a static chamber on plants to be tested; acquiring, by a flow meter, a gas flow rate in a gas pipe between the static chamber and a collection box in real time; acquiring collecting settings according to the collection box; and collecting a gas in the static chamber by using a corresponding collection loop according to the collection settings and the gas flow rate.

Alternatively, prior to the step of collecting a gas in the static chamber by using a corresponding collection loop according to the collection settings and the gas flow rate, the method further includes the following steps: exhausting air from all collection loops; and taking down collection gas bags in turn, and detecting greenhouse gas concentrations, and then calculating gas emission flux within sampling time.

According to the specific embodiment provided by the present disclosure, the present disclosure discloses the following technical effects:

In accordance with the automatic sampling device and method for determining greenhouse gas emission flux from farmland provided by the present disclosure, accurate timing sampling of greenhouse gases from the farmland and automatic control of the whole process are achieved through the collection box. Compared with manual gas collection, a lot of manpower and time costs are saved, and the problem that the gas collection is difficult to operate manually at night or at high frequency is effectively solved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide an automatic sampling device and method for determining greenhouse gas emission flux from farmland, which can achieve accurate timing sampling of greenhouse gases from the farmland and automatic control of the whole process.

To make the above objectives, features and advantages of the present disclosure more apparently and understandably, the present disclosure is further described in detail below with reference to the accompanying drawings and specific embodiments.

Figure 1:
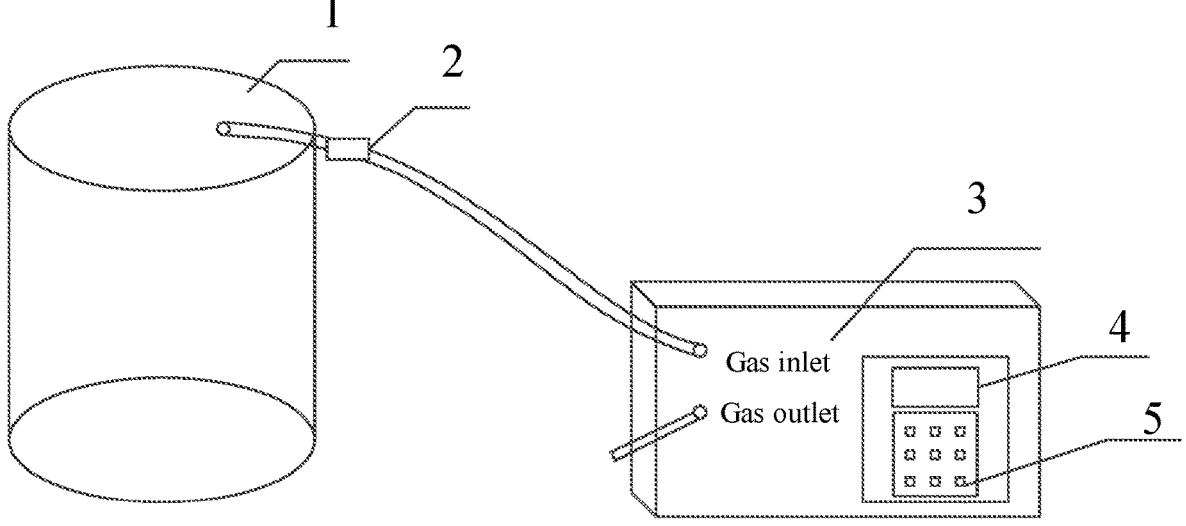
FIG. 1 is a structural schematic diagram of an automatic sampling device for determining greenhouse gas emission flux from farmland in accordance with the present disclosure.

FIG. 1 is a structural schematic diagram of an automatic sampling device for determining greenhouse gas emission flux from farmland in accordance with the present disclosure. As shown in FIG. 1, an automatic sampling device for determining greenhouse gas emission flux from farmland is provided. The automatic sampling device includes a static chamber 1, a flow meter 2, and a collection box 3.

The static chamber 1 communicates with a gas inlet of the collection box 3. The flow meter 2 is arranged in a gas pipe between the static chamber 1 and the collection box 3.

The static chamber 1 is used to cover plants to be tested and to keep the plants to be tested in a closed environment.

The flow meter 2 is used to determine a gas flow rate in the gas pipe between the static chamber 1 and the collection box 3 in real time.

The collection box 3 is internally provided with multiple collection loops and a controller. Each of the collection loops is used to collect a gas in the static chamber 1 at different time according to collection settings of the controller. The collection settings include: gas collection start time, gas collection time interval, and the number of collections.

The collection loop includes a gas inlet pipeline, a collection gas bag, and a gas outlet pipeline. The collection gas bag is a single-valve aluminum foil gas sampling bag.

The gas inlet pipeline is used to open a gas path according to a control of the controller for gas collection, and to close the gas path according to a control of the controller after the gas collection is completed.

The collection gas bag is used for gas collection and is closed after the gas collection is completed.

The gas outlet pipeline is used to open the gas path for gas exhausting according to a control of the controller after the collection of the collection gas bag is completed, and to close the gas path according to a control of the controller after the gas exhausting is completed.

Each of the gas inlet pipeline and the gas outlet pipe is provided with a solenoid valve. Preferably, the solenoid valve is a two-position three-way vacuum solenoid valve.

The collection box 3 also includes a gas intake pump, and a gas extraction pump.

A gas inlet of the gas intake pump communicates with the gas inlet of the collection box 3, and a gas outlet of the gas intake pump communicates with a gas inlet of a gas inlet path.

The gas intake pump is used to collect the gas in the static chamber 1 into a corresponding collection loop.

A gas inlet of the gas extraction pump communicates with a gas outlet of the gas outlet pipeline, and a gas outlet of the gas extraction pump communicates with a gas outlet of the collection box.

The gas extraction pump is used to exhaust gases from the gas inlet pipeline and the gas outlet pipeline in the collection loop.

Figure 2:
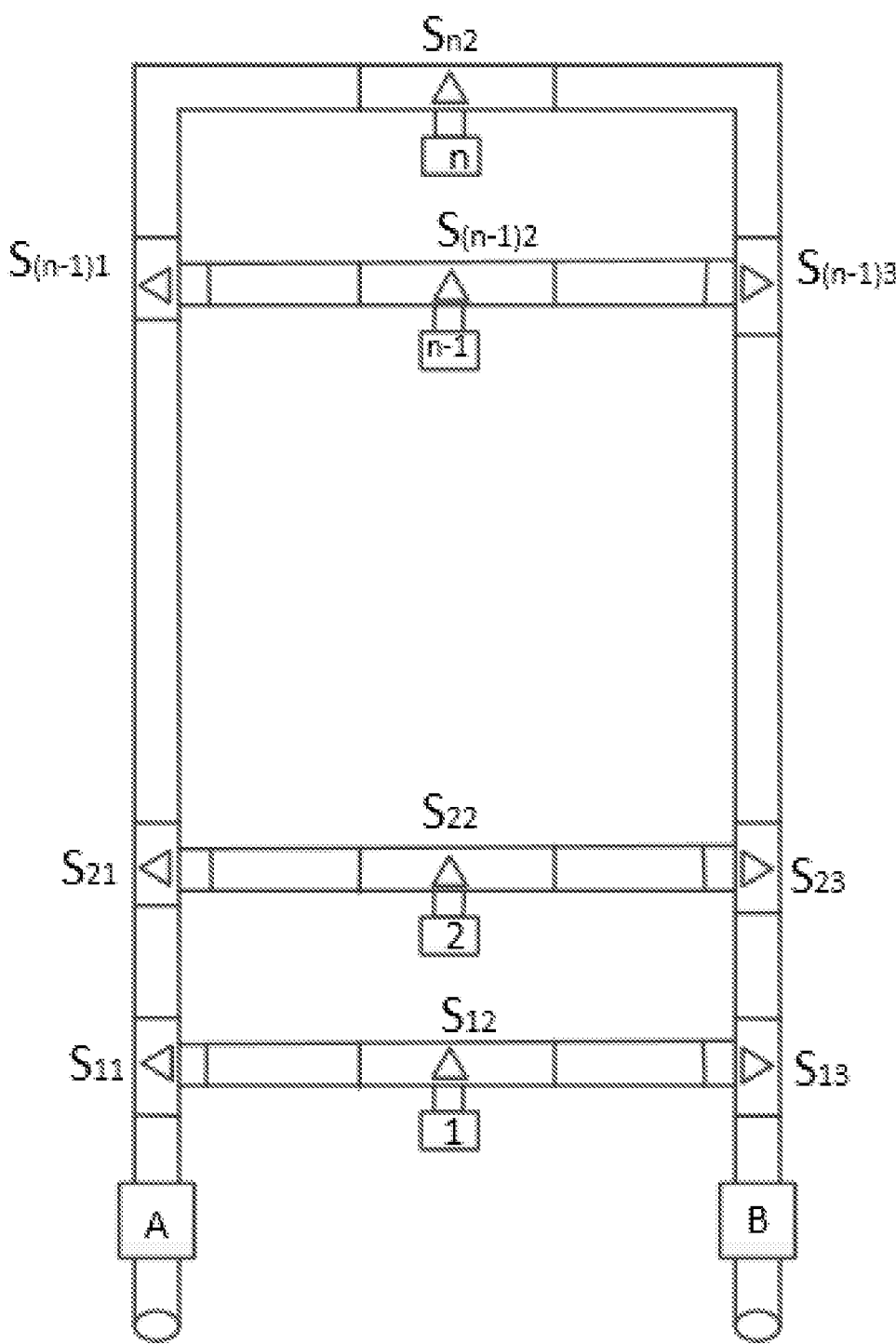
FIG. 2 is a structural schematic diagram of a collection loop in accordance with specific embodiments of the present disclosure.

As shown in FIG. 2, a gas collection process of the collection loop is explained through a specific embodiment.

As shown in FIG. 2, n collection gas bags, a gas intake pump A, a gas extraction pump B, and ($3n$-2) two-position three-way vacuum solenoid valves for controlling the switching among different gas pipe loops and gas intake and sealing of gas sampling bags are provided. Multiple connecting gas pipes used in the loop are silica gel hoses with equal length, thus facilitating the calculation of a gas flow rate in the gas pipe loop at later stage. A gas inlet pipeline corresponding to a first collection gas bag is a gas path among the gas intake pump A, $S_{11}$ and $S_{12}$. A gas outlet pipeline corresponding to the first collection gas bag is a gas path among $S_{11}$, $S_{12}$, $S_{13}$ and the gas extraction pump. A gas inlet pipeline corresponding to a second collection gas bag is a gas path between the gas intake pump A, $S_{11}$, $S_{21}$ and $S_{22}$. A gas outlet pipeline corresponding to the second collection gas bag is a gas path among $S_{11}$, $S_{21}$, $S_{22}$, $S_{23}$, $S_{13}$ and the gas extraction pump, and so on. Therefore, multiple collection loops are determined.

According to a mechanism shown in FIG. 2, the specific gas collection process is as follows:

Through an operation panel 5 on a chamber body of the automatic sampling device, gas collection start time is manually set to ton, the gas collection time interval is manually set to T, and the number of gas collections is manually set to n.

The collection gas bag has been exhausted before being installed in the collection loop.

Before the system starts to work, all solenoid valves are in a power-off state, and the gas extraction pump B starts to work for a time of $t_{B0}$ to exhaust the air in the collection loop.

Where $t_{B0}$ is obtained by calculating $$\int_0^{t_{B0}} v(t)dt = \pi r^2 (4nl + l_0),$$

$v(t)$ is a real-time flow rate of a gas in the loop determined by a flow meter 2, $l_0$ is a length of a hose connected between the static chamber 1 and the collection box 3, 1 is a length of each connecting gas pipe in the collection loop, the number of gas collections is n, and the lengths of the connecting gas pipes in the collection loop are equal.

After reaching the set gas collection start time $t_{on}$, n times of gas collection are conducted in turn, and the gas is stored in a first, a second, a third, a fourth . . . a n-th collection gas bags, and the time interval of each gas collection is T.

When $t=t_{si}$, the solenoid valves $S_{i1}$ and $S_{i2}$ are powered on, and the gas intake pump A starts to work for $t_{Ai}$ to inflate a gas bag numbered as i (i=1, 2, 3, 4 . . . n);

where $t_{si}=t_{on}+(i-1)T$.

When $t=t_{ei}$, the solenoid valves $S_{i1}$ and $S_{i3}$ are powered on, $S_{i2}$ is powered off, and the gas extraction pump B starts to work for $t_{Bi}$ to exhaust a gas loop where the gas bag numbered as i is located.

When i=1, $t_{ei}=t_{on}+t_{A1}$;

When $$i > 1, t_{ei} = t_{on} + (i-1)T + \sum_{m=1}^{i} t_{Am} + \sum_{m=1}^{i-1} t_{Bm}$$

$t_{Ai}$ can be calculated from $$\int_{t_{si}}^{t_{si}+t_{Ai}} v(t)dt = \pi r^2 [(i+1)l + l_0] + \xi_1 V_b,$$

$V_b$ is the volume of the collection gas bag, and $\xi_1$ is generally set to 0.85-0.9, and a certain margin is reserved for the volume of the gas bag.

$t_{Bi}$ can be calculated from $$\int_{t_{ei}}^{t_{ei}+t_{Bi}} v(t)dt = \xi_2 \pi r^2 [2(i+1)l + l_0] (i \neq 0),$$

and $\xi_2$ is generally set to 1.1-1.15, thus ensuring that all residual gas in the gas pipe is exhausted.

In particular, in the loop where the n-th collection gas bag is located, a common 90-degree right-angle adaptor elbow is used at the bend of the gas pipe, so during the gas collection process of the n-th collection gas bag, i.e., i=n, when $t=t_{sn}$, the solenoid valve $S_{n2}$ is powered on, the gas intake pump A starts to work for $t_{An}$ to inflate the gas bag numbered as n. When $t=t_{en}$, the solenoid valve $S_{n2}$ is powered off, and the gas extraction pump B starts to work for $t_{Bn}$ to exhaust the gas path where the gas bag numbered as n is located.

Specifically, a model of the controller is STM32F103. Based on timer and interrupt functions of the STM32F103 controller, the power-on and power-off time of the two-position three-way solenoid valve is accurately controlled by calculating the gas flow rate in the gas pipe loop, so as to avoid the problem that the gas bag is blown out due to long inflation time, and ensure the consistency of the gas collection time interval among multiple gas bags.

The collection box 3 also includes a display screen 4, and an operation panel 5, thereby achieving artificial settings of parameters such as gas collection start time, gas collection time interval, and the number of gas collections.

The display screen 4 is connected to the operation panel 5, and the operation panel 5 is connected to the controller.

Corresponding to above device, an automatic sampling method for determining greenhouse gas emission flux from farmland is also provided by the present disclosure to achieve the automatic sampling device. The automatic sampling method includes the following steps.

Plants to be tested are covered with a static chamber 1.

A flow meter 2 is used to acquire a gas flow rate in a gas pipe between the static chamber 1 and a collection box 3 in real time.

Collecting settings are acquired according to the collection box 3.

According to the collection settings and the gas flow rate, a gas in the static chamber 1 is collected by using a corresponding collection loop.

Prior to the step of collecting a gas in the static chamber by using a corresponding collection loop according to the collection settings and the gas flow rate, the method also includes the following steps:

Air in all collection loops is exhausted.

The collection gas bags are taken down in turn, and greenhouse gas concentrations are detected, and then gas emission flux within sampling time is calculated.

Embodiments in this specification are described in a progressive manner, each embodiment focuses on differences from other embodiments, and the same and similar parts between the embodiments can be referred to each other. Since the system disclosed in the embodiments correspond to the method disclosed by the embodiments, the description thereof is relatively simple, and for relevant matters references may be made to the description of the method.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An automatic sampling device for determining greenhouse gas emission flux from farmland, comprising a static chamber, a flow meter, and a collection box; wherein the static chamber communicates with a gas inlet of the collection box; the flow meter is arranged in a gas pipe between the static chamber and the collection box;

the static chamber is used to cover plants to be tested and to keep the plants to be tested in a closed environment;

the flow meter is used to determine a gas flow rate in the gas pipe between the static chamber and the collection box in real time; and the collection box is internally provided with a plurality of collection loops and a controller, each collection loop is used to collect a gas in the static chamber at different time according to collection settings of the controller; and the collection settings comprise: gas collection start time, gas collection time interval, and the number of collections, wherein the collection loop comprises a gas inlet pipeline, a collection gas bag, and a gas outlet pipeline; wherein the gas inlet pipeline is used to open a gas path according to a control of the controller for gas collection, and to close the gas path according to a control of the controller after the gas collection is completed;

the collection gas bag is used for gas collection and is closed after the gas collection is completed; and the gas outlet pipeline is used to open the gas path for gas exhausting according to a control of the controller after the collection of the collection gas bag is completed, and to close the gas path according to a control of the controller after the gas exhausting is completed; and wherein the collection box further comprises a gas intake pump and a gas extraction pump; wherein a gas inlet of the gas intake pump communicated with the gas inlet of the collection box, and a gas outlet of the gas intake pump communicates with a gas inlet of a gas inlet path;

the gas intake pump is used to collect the gas in the static chamber into a corresponding collection loop;

a gas inlet of the gas extraction pump communicates with a gas outlet of the gas outlet pipeline, and a gas outlet of the gas extraction pump communicates with a gas outlet of the collection box; and the gas extraction pump is used to exhaust gases from the gas inlet pipeline and the gas outlet pipeline in the collection loop.

2. The automatic sampling device for determining greenhouse gas emission flux from farmland according to claim 1, wherein each of the gas inlet pipeline and the gas outlet pipe is provided with a solenoid valve.

3. The automatic sampling device for determining greenhouse gas emission flux from farmland according to claim 1, wherein the collection box further comprises a display screen, and an operation panel; and the display screen is connected to the operation panel, and the operation panel is connected to the controller.

4. An automatic sampling method for determining greenhouse gas emission flux from farmland, which uses the automatic sampling device according to claim 1, wherein the automatic sampling method comprises the following steps:

covering the static chamber on plants to be tested;

a acquiring, by the flow meter, a gas flow rate in the gas pipe between the static a chamber and the collection box in real time;

acquiring collecting settings according to the collection box; and collecting a gas in the static chamber by using a corresponding collection loop according to the collection settings and the gas flow rate.

5. The automatic sampling method for determining greenhouse gas emission flux from farmland according to claim 4, wherein each of the gas inlet pipeline and the gas outlet pipe is provided with a solenoid valve.

6. The automatic sampling method for determining greenhouse gas emission flux from farmland according to claim 5, wherein prior to the step of collecting a gas in the static chamber by using a corresponding collection loop according to the collection settings and the gas flow rate, the method further comprises the following steps:

exhausting air from all collection loops; and taking down collection gas bags in turn, and detecting greenhouse gas concentrations, and then calculating gas emission flux within sampling time.

7. The automatic sampling method for determining greenhouse gas emission flux from farmland according to claim 4, wherein the collection box further comprises a display screen, and an operation panel; and the display screen is connected to the operation panel, and the operation panel is connected to the controller.

8. The automatic sampling method for determining greenhouse gas emission flux from farmland according to claim 7, wherein prior to the step of collecting a gas in the static chamber by using a corresponding collection loop according to the collection settings and the gas flow rate, the method further comprises the following steps:

exhausting air from all collection loops; and taking down collection gas bags in turn, and detecting greenhouse gas concentrations, and then calculating gas emission flux within sampling time.

9. The automatic sampling method for determining greenhouse gas emission flux from farmland according to claim 4, wherein prior to the step of collecting a gas in the static chamber by using a corresponding collection loop according to the collection settings and the gas flow rate, the method further comprises the following steps:

exhausting air from all collection loops; and taking down collection gas bags in turn, and detecting greenhouse gas concentrations, and then calculating gas emission flux within sampling time.

* * * * *